United States Patent [19]

Hoppe

[11] Patent Number: 4,852,911
[45] Date of Patent: Aug. 1, 1989

[54] IDENTIFICATION CARD HAVING A MAGNETIC TRACK COVERED BY COLOR AND METHODS FOR PRODUCING IT

[75] Inventor: Joachim Hoppe, Munich, Fed. Rep. of Germany

[73] Assignee: GAO Gesellschaft fur Automation und Organisation mbH, Fed. Rep. of Germany

[21] Appl. No.: 119,782

[22] Filed: Nov. 12, 1987

[30] Foreign Application Priority Data

Nov. 12, 1986 [DE] Fed. Rep. of Germany ....... 3638575

[51] Int. Cl.⁴ .......................... B42D 15/00; G09F 3/00
[52] U.S. Cl. ........................................ 283/82; 283/109
[58] Field of Search ............... 283/70, 72, 74, 81, 283/82, 91, 109; 235/449, 493, 380; 156/246

[56] References Cited

U.S. PATENT DOCUMENTS

| | | | |
|---|---|---|---|
| 4,499,126 | 2/1985 | Suzuki et al. | 283/82 |
| 4,507,550 | 3/1985 | Fleer | 283/82 |
| 4,545,828 | 10/1985 | Minkus et al. | 283/109 |
| 4,620,727 | 11/1986 | Stockburger | 283/82 |
| 4,630,845 | 12/1986 | Sanner | 283/82 |

FOREIGN PATENT DOCUMENTS

| | | | |
|---|---|---|---|
| 2302565 | 9/1976 | France | 283/82 |
| 2026946 | 2/1980 | United Kingdom | 283/82 |
| 2068295 | 8/1981 | United Kingdom | 283/82 |

Primary Examiner—Frank T. Yost
Assistant Examiner—Paul M. Heyrana, Sr.
Attorney, Agent, or Firm—Robert J. Koch

[57] ABSTRACT

In order to simplify the production of an identification card having a colored magnetic track, it is proposed that the magnetic track located on the laminating or transfer band be masked by a white layer of color. By applying the white masked magnetic track to a white colored card layer or to a transparent layer to be underlaid with a white colored layer, one produces a completely user-neutral semifinished product. This iniformly designed semifinished product can then be provided on one or both sides with the particular printed pattern desired as one chooses. the design being selected without any separate consideration of the stripe area.

11 Claims, 6 Drawing Sheets

FIG. 12
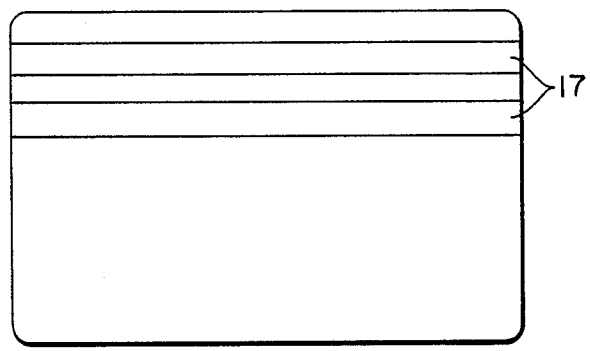
FIG. 13
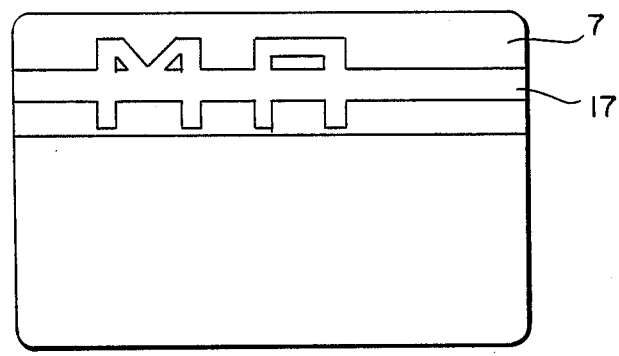
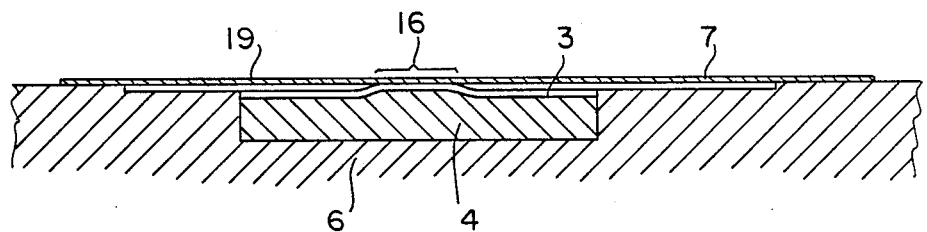
FIG. 14

IDENTIFICATION CARD HAVING A MAGNETIC TRACK COVERED BY COLOR AND METHODS FOR PRODUCING IT

BACKGROUND OF THE INVENTION

The present invention relates to an identification card comprising at least one opaque card layer, at least one magnetic track applied to one side of the card with a carrier band and covered by one or more layers, and a printed pattern applied to the card surface and to methods for producing it.

Identification cards (referred to as "ID cards" in the following) are widely used today as identification cards, check cards, or customer cards. For automatic processing, these cards are provided with magnetic stripes on which person-related, card-related and/or other information is recorded. This information may be updated constantly if desired.

The magnetic track is applied by laminating band or transfer band techniques. The laminating band technique involves prefabricating the magnetic track on a carrier band in the shape of stripes. This band is embedded in a subsequent step in the card cover film together with the magnetic coating. In the transfer method, the materials and series of layers are selected in such a way that the carrier band can be removed from the card cover layer after the magnetic layer has been transferred thereto.

The magnetic track itself is generally brown or black. These colors drastically restrict the possibilities for designing the printed pattern on the card. There have been attempts to integrate the magnetic track better into the card design by taking additional measures.

European patent application No. 0 071 850 proposes to integrate a magnetic track into the card design by its shape. The magnetic track may be in the form of an "insular" but still longish stripe. Although the magnetic track is preferably covered by a non-magnetic metal layer and/or a layer of color, it can still be recognized as a magnetic track. This "insular" stripe no longer divides the printed pattern of the card so harshly into two completely separate zones.

The card design is made to enclose the area of the magnetic track so that the appearance is less disturbed by the track. This specially cut magnetic stripe is applied to the card together with one or more layers of color by transfer band techniques. In one embodiment, the transfer band carrier bears a layer of color and a magnetic layer thereabove. The magnetic track is given the desired shape by punching out the transfer layers on a carrier band using appropriately formed tools. The excess layer material surrounding the stripe is then removed and the shaped layers are applied with the aid of the carrier band to the transparent cover film layer. The carrier band is removed and the "insular" magnetic track overprinted with color is pressed into the film.

The magnetic stripe provided in this way thus adds color to a printed pattern applied to a deeper core layer of the card. In order to optimize the color-covered magnetic track to the particular design desired, both the shape of the magnetic strip and the overprint color must be selected for each series of cards.

For each series of cards a unique matching transfer band must be produced. Furthermore, each change in the card series requires replacing the transfer band and the sheet register synchronization.

Because separate transfer bands must be prepared for each series of cards in EPA No. 0 0 071 850, the transfer band registration is additionally complicated by the phase relation of the band to the card. This adjustment must be performed anew before producing each card series. Small-lot production is made much more expensive and mass production is difficult due to the amount of effort involved.

SUMMARY OF THE INVENTION

The invention addresses the problem of making an ID card having a magnetic track covered by color so as to allow inexpensive production of both small and large lots.

This problem is solved by applying a white masking layer with high covering power and a magnetic layer to the carrier band;

transferring the magnetic layer and the masking layer with the aid of this carrier band to a white colored or transparent plastic card cover layer in such a way that the magnetic layer lies between the masking layer and the card cover layer;

printing the card cover layer in the area of the white masked magnetic layer and optionally also in the other areas of the card cover layer;

joining the printed card cover layer with at least one further card layer, this further card layer being colored or transparent if the card cover layer provided with the magnetic layer is colored white, or being colored white if the card cover layer is transparent;

laminating the card cover layer with the other layer(s) to form the desired layer structure of the identification card;

punching the individual card(s) out of the layer structure.

The inventive method makes it possible to detach the laminating or transfer band production from the card production even when producing cards having colored magnetic tracks. The invention also produces a completely user neutral semifinished product by applying the magnetic track (masked in white) directly to a white card layer or to a transparent layer to be under laid with a white layer. This allows for producing white ID cards having both sides of a completely neutral white appearance.

This semifinished product can then be provided with the particular printed pattern desired on one or both sides. The design may be selected without having to consider the placement of the magnetic stripe area. Furthermore, the uniformed white design of the semifinished product does not shift or obscure colors in the magnetic area even if thin, printed layers or light (possibly transparent) inks are used for the printed pattern. The colors for the printed pattern can therefore be selected without variation from standard color charts.

There are no special restrictions of the colors. The colors of the printed pattern are influenced by the white masking layer and the white card layer in the same way so the card is no longer divided into several zones by a magnetic stripe area coloring that deviates from its surroundings.

A further advantageous consequence of the invention is that the same type of laminating band or transfer band can be used for all card series. Thus, the band can be produced and purchased in large numbers inexpensively. At the same time this uniformity drastically reduces the required inventory.

During the production process, a change in the card design does not require laminating or transfer bands replacement or any other manual intervention in the band means. The calibration rejects usually produced with every card series are not obtained which makes small-lot production more economical.

The white masking layer in the magnetic area can also be exploited in designing the printed pattern. In one advantageous embodiment, the printed pattern is applied by negative screen process printing (the left-out or free areas being shaped as letters) and representing any desired information. These areas are preferably covered by transparent lacquer in positive printing to protect the preferably thin white masking layer against abrasion.

The negative screen printing may optionally be performed with several colors, preferably leaving a small unprinted gap between all color zones at least in the area of the magnetic track. These gaps avoid the formation of "steps". They arise when printed layers overlap and may disturb the magnetic recording. Furthermore, the white spaces between the color zones due to these gaps provide further possibilities for varying the design of the printed pattern. The layer thickness of the color layer or transparent lacquer is approximately constant over the entire magnetic stripe area. Thus, the magnetic head is always the same distance away from the magnetic layer all along the track and provides signals of the same quality all along the track when the magnetic information is scanned.

BRIEF DESCRIPTION OF THE DRAWINGS

FIGS. 10 to 14 show further embodiments of inventive ID cards.

DETAILED DESCRIPTION OF THE DRAWINGS

Figure 1:
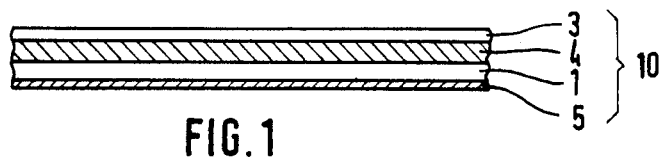
FIG. 1 shows a laminating band with a magnetic tack masked by color.

FIG. 1 shows a laminating band for transferring a magnetic track to the card. Transfer techniques using carrier bands have generally proved to be particularly economical for various reasons. Because the magnetic track can be produced independently of the card on separate specialized production equipment, this ensures constant layer quality to a high degree. In particular, larger surfaces such as a wide carrier band can be coated as is customary in the production of magnetic tapes for sound and video technology. These can then be cut into bands of any desired width.

As can be seen in FIG. 1, laminating band 10 is produced by applying a series of layers comprising magnetic layer 4 and masking layer 3 successively and in superposition to carrier band 1 of synthetic material, such as polyester. Magnetic layer 4 is applied to the carrier band and a white masking layer is preferably applied by intaglio printing to the dried magnetic layer. This makes possible layer thicknesses of less then 10 um in good printing quality. For this masking layer, white inks are selected which have high covering power even with a layer thickness of only a few um, so that the dark color of magnetic layer 4 is completely masked by white layer of color 3 and the distance between the magnetic head and the magnetic track is as small as possible. Thus, the magnetic track is writable and readable to a sufficient degree even in the case of high recording density. If suitable colors are not very resistant to abrasion due to their high proportion of pigment and a resulting lower proportion of medium, they may be protected from abrasion by the color or transparent lacquer printed on the masking layer during card production.

Figure 2:
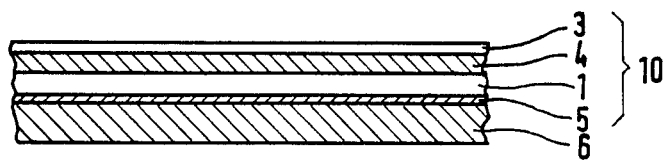
FIG. 2 shows a cross-sectional view of the card cover layer with a magnetic track embedded therein.

Laminating band 10 is then rolled hot onto card cover layer 6 during ID card production (FIG. 2). Carrier band 1 becomes bonded to the card cover layer. The carrier band thus remains under the magnetic track, which is masked by white for the observer, on card cover layer 6.

In order to obtain a good adhesive effect between carrier band 1 and card cover layer 6, the carrier band may be provided with an additional adhesive layer 5 (melt adhesive).

Card cover layer 6 itself may be colored white or be transparent. In the latter case, the transparent layer is applied to another card layer which is colored white and may contain a printed pattern.

Card cover layer 6 is made of a thermoplastic synthetic of PVC, in which the white masked magnetic layer can be embedded under the effect of heat and pressure in such a way that the white masking layer and card cover layer 6 form a smooth surface.

The cards are usually produced in a sheet with plurality of individual copies. Card cover layer 6 may be in the form of either a sheet or an endless roll out of which the multi-copy sheets are then cut.

Figure 3:
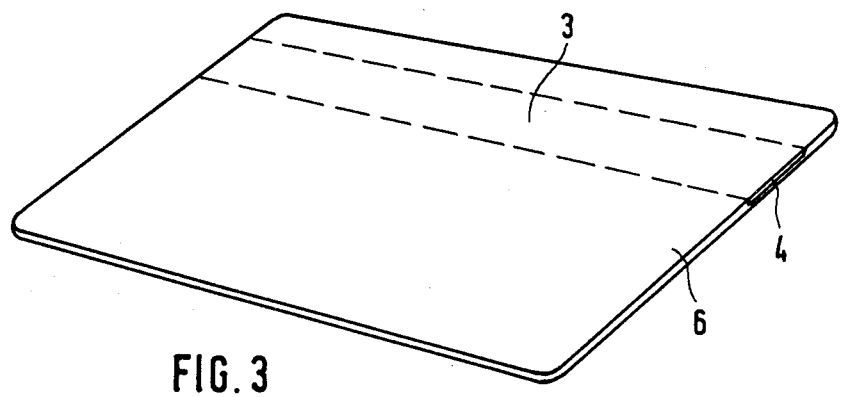
FIG. 3 shows this card cover layer from the top.

FIG. 3 shows the semifinished product made by the inventive method comprising unprinted card cover layer 6 (already in the form of the later ID card for the sake of clarity) with magnetic track 4 masked by white. The position of masking layer 3 is indicated by the two dotted lines.

Both the laminating band (provided with white masking layer 3) and sheets 6 (having magnetic stripes) are completely neutral. The semifinished product shown in FIG. 2 and 3 can be used for a great variety of ID cards and a Great variety of users.

An advantage of the invention is that the same transfer band and same sheet material can be used for many different ID card series. Because no readjustment of the transfer band feed is necessary when the card design changes, the rejects usually obtained thereby are no longer formed.

Figure 4:
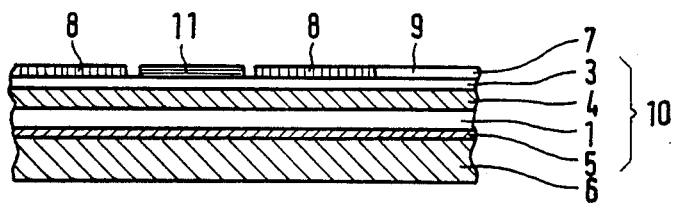
FIG. 4 shows the card cover layer after the printing process.
Figure 5:
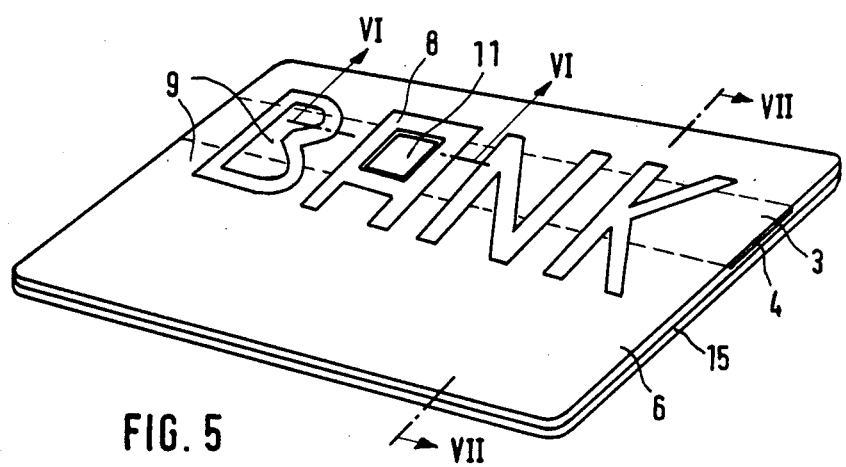
FIG. 5 shows an inventively produced ID card.

This user-neutral, semifinished product can then be provided in the next step with printed layer 7 (FIGS. 4 and 5). This is preferably done in precisely the same way as the magnetic track is transferred to the endless sheet or individual sheets. Due to the neutral background, printed layer 7 can extend across the entire surface of the card independently of the magnetic track.

FIGS. 4 and 5 show possible embodiments for the printed pattern with areas of color 8 and 11 and transparent lacquer covering 9. Since white masking layer 3 is printed only after being applied to card layer 6, the printed pattern can be applied without any consideration of the exact ultimate position of the magnetic band. If positioning errors are made when the laminating band is applied, they do not lead to any disturbing displacements in the printed pattern. The printed pattern is thus always executed precisely.

After the printing process, sheet 6 is laminated with other sheets forming other card layers. The cards are then punched out.

FIG. 5 shows the finished card comprising printed card cover layer 6 and a further card layer 15. The printed pattern can extend over the entire card area and is not limited to the area of the magnetic track or the other card areas The printed pattern may be applied by various printing techniques. Screen printing is one such technique. It has a transparent lacquer covering 9 at least in the area of the magnetic track on the areas not covered by areas of color 8 and 11.

Figure 6:
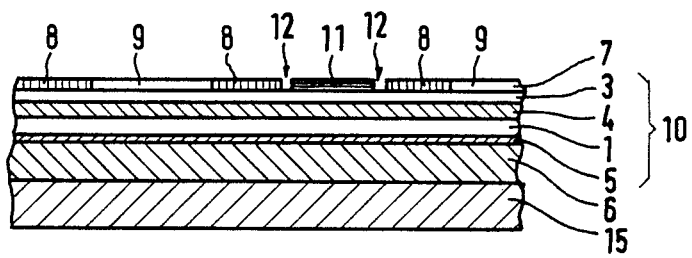
FIGS. 6 and 7 show possible embodiments of ID cards.

FIG. 6 shows the cross-section VI—VI of the card shown in FIG. 5 with card layers 6 and 15. On card cover layer 6 there is the series of layers comprising adhesive layer 5, carrier band 1, magnetic layer 4 and masking layer 3 as well as printed layer 7.

Printed layer 7 comprises area of color 8, transparent lacquer covering 9 and area of color 11. The quality of the magnetic signal from scanning is improved by printing the transparent lacquer and the ink (or various inks) in the same thickness without overlap in the area of the magnetic layer. This makes it possible for the scanning head always to be the same distance away from the magnetic track when reading and writing and for the magnetic signals to be damped by a constant factor all along the magnetic track. As shown in FIG. 6, the various areas of color 8, 1 may be designed so as to have a small gap 12 there between. These gaps are so narrow that they do not impair the run of the magnetic head during scanning and the white masking layer need not be protected by a transparent lacquer cover here either. Futhermore, this gap 12 causes area of color 11 to be surrounded by a fine white edge, resulting in further design effects.

Figure 7:
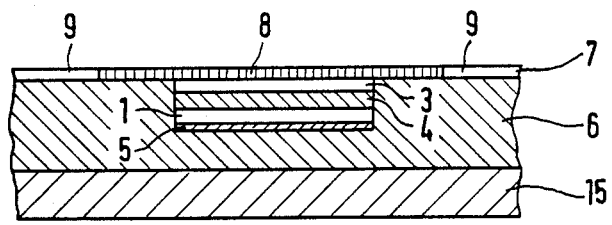

FIG. 7 shows the cross-sectional view VII—VII of the card shown in FIG. 5. Prior to the printing process, the layers were applied with a laminating band (adhesive layer 5, carrier layer 1, magnetic layer 4 and masking layer 3) and were pressed into the card cover layer so that there is a smooth surface for the printing process. Printed layer 7 can then be applied without any problem both to the white masking layer and to parts of the rest of the card cover layer surface.

Card layer 6 may be the white colored card layer, for example, or a transparent cover layer under laid with a white synthetic layer.

If the magnetic track is first applied to a transparent synthetic film which is then transferred to a white background surface, this white background surface may have a presented pattern.

Figure 8:
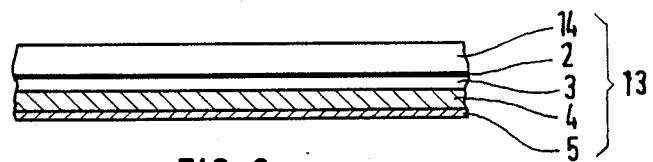
FIG. 8 shows a transfer band with a magnetic track masked by color.

Another preferred technique for transferring magnetic tracks is the so-called transfer method. One uses transfer bands provided with a magnetic layer which forms an intermediate carrier for the magnetic track. FIG. 8 shows such a transfer band.

Unlike the laminating band, the transfer band bears the layers to be applied in he reverse order on the carrier band. A separation layer 2, white masking layer 3, magnetic layer 4 and an adhesive layer 5 are applied on top of each other sequentially and in the above-mentioned order to carrier band 14 (made of polyester, for example). Because the magnetic layer is applied to the masking layer in a liquid form, one should select the magnetic ink so that the dark magnetic ink not penetrate into the pores of the masking layer and impair the covering effect.

The completed transfer band is rolled hot onto the card cover layer and the carrier band removed so that only the white masking layer, the magnetic layer, and the adhesive layer remain on the card layer. A thin separation layer (for example, paraffin wax) between the transfer band carrier and the white masking layer is recommended for carrier band removal.

If synthetic materials which bond together sufficiently well solely by the action of heat and pressure are used for the card cover layer and the base material of the magnetic layer, adhesive layer 5 may be omitted.

Figure 9:
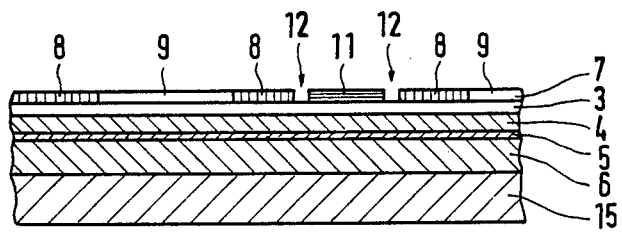
FIG. 9 shows and ID card having a magnetic track applied by the transfer method.

FIG. 9 shows an ID card produced by this method. As in the above examples, printed pattern 7 may have different areas of color 8 and 11 possibly separated by narrow gaps 12. Here too, larger film areas in the magnetic track area are preferably covered by a transparent lacquer layer 9.

As already stated above, one must make sure that the distance between the magnetic head and the magnetic track is as small as possible, i.e. that the number or thickness of the masking layers for the magnetic track is kept to a minimum. In the above examples, excellent writing and reading security is given at a writing density of 75 bpi. (This writing density corresponds to the writing density for track 2 according to ISO Standard 7811/2.) Writability and readability are sufficient even at an extremely high writing density of 210 bpi (ISO Standard 7811/2 for tracks 1 and 3).

However, writing and reading security for the writing of the magnetic track with such high bit densities can also be considerably improved by simple measures to be explained in the following.

Figure 10:
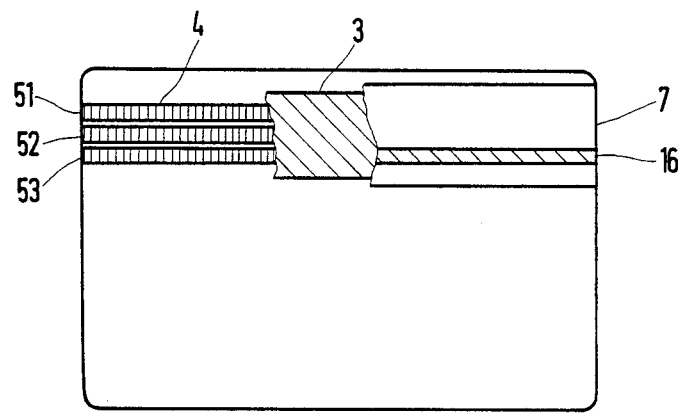

For example, the design print, i.e. the printed layer above the masking layer, may be interrupted in the areas in question. FIG. 10 shows such an embodiment. For the sake of clarity, the reading and writing tracks in magnetic layer 4 (according to ISO Standard 7811/2 there are three tracks, page 1, page 2 and page 3) are shown separated. Magnetic layer 4 is masked by masking layer 3, to which printed card design color layer 7 is then applied. In area 16, which corresponds here to ISO track 3, this design print is interrupted. This visible interruption must of course be taken into consideration during development of the card design, but has a much less disturbing effect due to the smaller area then an interruption in the design print extending over the entire magnetic track area.

Figure 11:
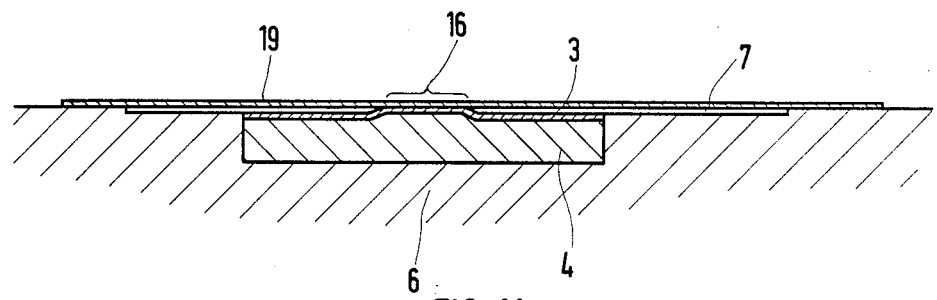

FIG. 11 shows the cross-sectional view of such a card after lamination, during which the card acquires its smooth surface and the printed layers, magnetic layers, etc. are pressed into the adjacent card layers. In area 16 (left free of the design print), magnetic layer 4 is separated from the card surface only by masking layer 3 and optionally also a thin layer 19 of transparent lacquer. During the magnetic recording/scanning, the distance between the magnetic head and the magnetic layer is accordingly reduced. Even small reductions of distance may contribute considerably to further improving the writing and reading security due to the specific magnetic field shape with the known magnetic heads.

Printed layer 7 of the design print may, as shown in FIG. 12, cover the entire card surface and only leave out corresponding writing and reading tracks 17 which are actually used in the subsequent card application. The example shown here involves two tracks extending over the entire card length. The print may also cover only part of the card surface and/or comprise writing, a pattern, or the like due to corresponding further free spaces 18 (FIG. 13).

In extreme cases, masking layer 3 may also be dispensed with when magnetic layer areas 16 are of high writing density (see FIG. 14). However, the magnetic layer then appears as a black or brown color thereby restricting the possibilities of design for the appearance of the card.

The measures shown in the latter examples for selectively increasing the writing and reading security of certain magnetic track areas can be used also when the masking layer has a different color.

The zones free from the design print ensure in any case that little or no excessive lacquer layer thicknesses are applied over high density tracks which might lead to impermissible signal dampening. Furthermore, no jumps in thickness due to imprecise register or lacquer layer interruptions due to design contours are present which could cause signal distortion. A further advantage results from the possibility of applying a very thin protective layer of transparent lacquer over the entire magnetic track width. Transparent lacquer can be applied much more thinly than colored lacquer. By reducing the solids in the transparent lacquer one obtains a reduction of the wet application thickness and improved absorption properties.

I claim:

1. A method for making an identification card having at least one opaque card layer, at least one magnetic track applied to one side of the card with a carrier band and covered by one or more layers and a printed pattern applied to the card surface, characterized by the steps of:
   applying a white masking layer with high covering power and a magnetic layer to a carrier band,
   transferring the magnetic layer and the masking layer with the aid of this carrier band to a white or transparent plastic card cover layer in such a way that the magnetic layer comes to lie between the masking layer and the card cover layer;
   printing the card cover layer at least in the areas of the white masked magnetic layer;
   joining the printed card cover layer with at least one further card layer, this further card layer being colored white or transparent if the card cover layer provided with the magnetic layer is colored white, or being colored white if the card cover layer is transparent;
   laminating the card cover layer with at least one other layer to form a desired layer structure of an identification card; and
   punching the individual card(S) out of the layer structure.

2. A method according to claim 1, wherein the applying and transferring steps comprise:
   applying the magnetic layer to the carrier band;
   applying the white masking layer to said magnetic layer;
   transferring the carrier band comprising said magnetic layer and said white masking layer to said card cover layer so that said carrier band is dispose between said card cover layer and said magnetic layer.

3. A method according to claim 2, wherein the step of transferring comprises adhering the carrier band by an adhesive layer to said card cover layer so that adhesion is obtained between the carrier band and the card cover layer.

4. A method according to claim 1, wherein the applying and transferring steps further comprise:
   applying the white masking layer to the carrier band;
   applying the magnetic layer to said white masking layer on said carrier band;
   transferring the carrier band to the card cover layer so that the magnetic layer faces the card cover layer; and
   removing the carrier band from the white masking layer.

5. A method according to claim 4, further comprising applying a separation layer to said carrier band before said white masking layer is applied to the carrier band in order to ensure the subsequent detachment of the carrier band from the white masking layer.

6. A method according to claim 1, further comprising printing said card cover layer with a printed pattern independent of said magnetic track area.

7. A method according to claim 1, wherein said white masking layer is covered with an ink or lacquer over most of said magnetic area.

8. A method according to claim 7, wherein the ink/or lacquer is applied in a constant thickness and without overlap at least over said magnetic area.

9. A method according to claim 8, wherein said ink is applied in such a way as to leave a narrow, unprinted gap between various areas.

10. A method for making an identification card comprising at least one white opaque card layer, at least one magnetic track applied to one side of the card with a carrier band and covered by one or more layers, and a printed pattern applied to the card surface, characterized by the steps of:
    applying a masking layer with a high covering power and a magnetic layer to a carrier band;
    transferring the magnetic layer and the masking layer with the aid of this carrier band to a plastic card cover layer in such a way that the magnetic layer comes to lie between the masking layer and the card cover layer;
    printing the card cover layer at least in the area of the masked magnetic layer whereby some areas of said magnetic layer are left free of the print and/or the masking;
    joining the printed card cover layer with at least one further card layer;
    laminating the card cover layer with at least one other layer to form a desired layer structure of said identification card; and
    punching an individual card out of said layer structure.

11. An identification card comprising
    at least one opaque card layer;
    at least one magnetic track applied to one side of the card with a carrier band and covered by one or more layers, said magnetic track having areas of higher bit density and areas of lower bit density relative to said areas of higher bit density;
    a colored layer with high covering power; and
    at least one further printed layer applied to said covered layer, wherein said colored layer or said at least one printed layer or both said colored layer and said at least one printed layer do not areas of the magnetic track having higher bit density.

* * * * *